United States Patent [19]

Gobetz

[11] 4,080,525

[45] Mar. 21, 1978

[54] LASER WELDING APPARATUS FOR PIPE

[75] Inventor: Frank W. Gobetz, South Windsor, Conn.

[73] Assignee: United Technologies Corporation, Hartford, Conn.

[21] Appl. No.: 669,721

[22] Filed: Mar. 24, 1976

[51] Int. Cl.² .............................................. B23K 9/00
[52] U.S. Cl. ........................ 219/121 L; 219/121 LM
[58] Field of Search .......... 219/60 R, 121 L, 121 LM

[56] References Cited

U.S. PATENT DOCUMENTS 4,001,543   1/1977   Bove ............................... 219/121 L

*Primary Examiner*—J. V. Truhe
*Assistant Examiner*—Fred E. Bell
*Attorney, Agent, or Firm*—Prutzman, Hayes, Kalb & Chilton

[57] ABSTRACT

Apparatus for externally welding a seam along abutting lengths of pipe with the pipe being supported on site in position, e.g., on the ground, the apparatus having laser transmitting means which includes optically coupled individual reflectors supported for orbital movement about the seam, the optically coupled individual reflectors serving to provide a folded multiple reflection path to the seam for transmitting a focused laser beam onto the seam along a predetermined section thereof below the pipe axis.

20 Claims, 10 Drawing Figures

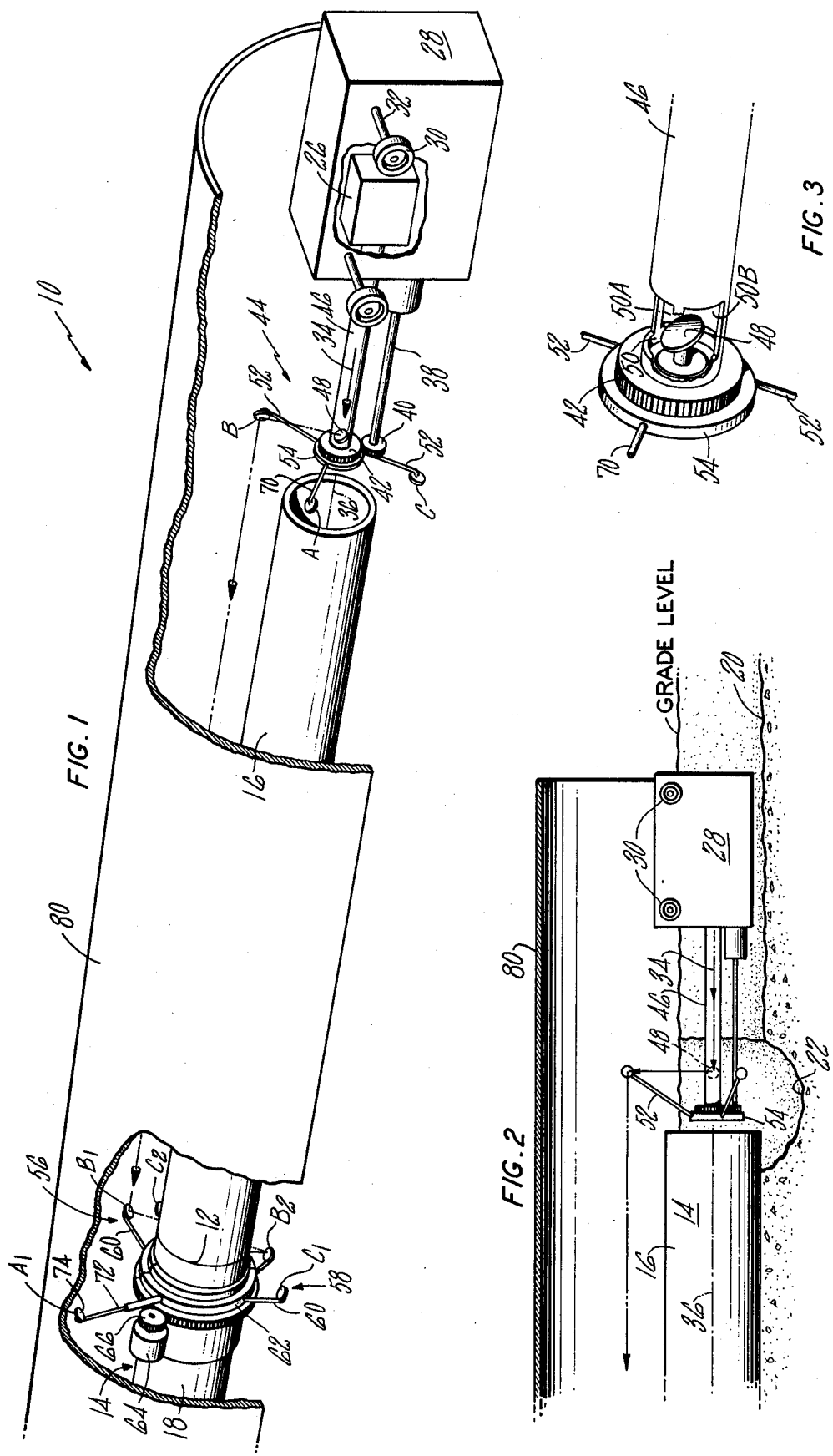

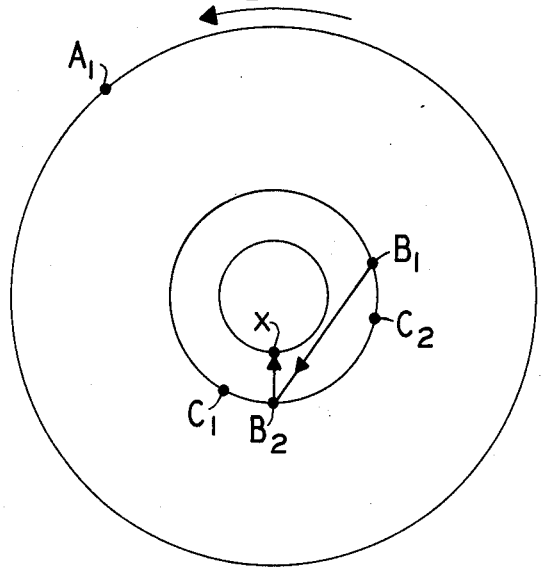
FIG.6 START POSITION BEAM PATH $B_1-B_2-X$
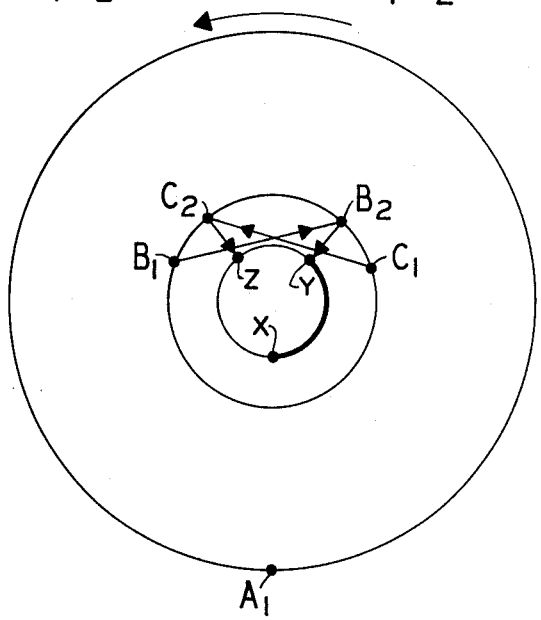
FIG.7 FIRST BEAM SWITCHING POSITION BEAM PATH $B_1-B_2-Y$ SWITCHED TO $C_1-C_2-Z$
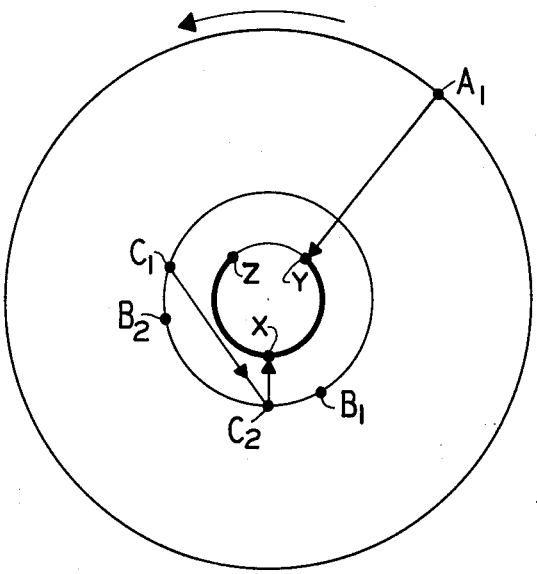
FIG.8 SECOND BEAM SWITCHING POSITION BEAM PATH $C_1-C_2-X$ SWITCHED TO $A_1-Y$
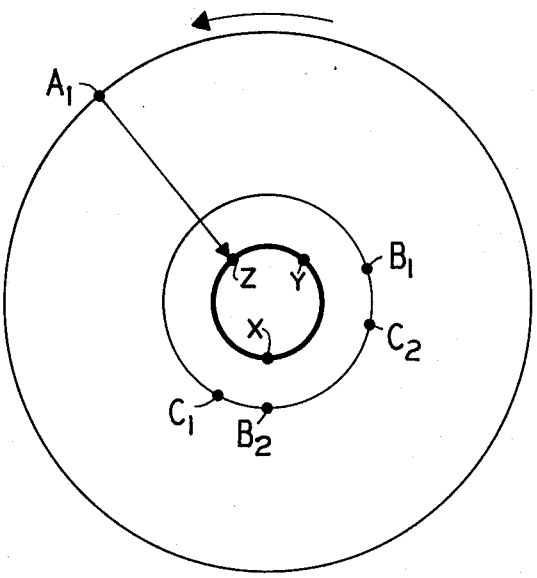
FIG.9 FINAL POSITION BEAM PATH $A_1-Z$

LASER WELDING APPARATUS FOR PIPE This invention relates to welding pipe sections and particularly concerns on site welding along an external joint of abutting pipe lengths by a laser beam.

A primary object of this invention is to provide a new and improved apparatus for welding pipe in the field and specifically welding an additional pipe length which is situated in a desired position partially or even entirely below grade before welding.

A further object of this invention is to provide an apparatus of the type described which minimizes the digging normally required to lay and weld pipe lengths together in a pipeline path.

Another object of this invention is to provide such an apparatus particularly suited to direct a laser beam in a circular sweeping movement along a longitudinally extending upper outside surface of the pipe length to be added and which effects a full circular weld even though the pipe length to be added is supported between ends by the ground.

A further object of this invention is to provide such an apparatus which features alignment requirements which are dependent on the joint to be welded rather than on the axis of the pipe, e.g., and which is therefore independent of sag which may exist in the pipe lengths which are being welded.

Yet another object of this invention is to provide an apparatus of the type described wherein adjustment of the laser beam focus is readily accomplished in an apparatus of simplified construction easy to manufacture and assemble and which is particularly suited for quick and easy use in the field for ensuring quality welds.

Other objects will be in part obvious and in part pointed out more in detail hereinafter.

A better understanding of this invention will be obtained from the following detailed description and the accompanying drawings of an illustrative application of the invention.

In the drawings:

FIG. 1 is an isometric view, partly broken away, showing an apparatus incorporating this invention;

FIG. 2 is a reduced side view of an upstream end of the apparatus of FIG. 1;

FIG. 3 is an enlarged isometric view, partly broken away, showing details of a laser beam switching component at the upstream end of the apparatus;

FIGS. 6–9 are sketches of projections perpendicular to the pipe axis of paths of movement of downstream reflectors of the apparatus of FIG. 1 about the pipe axis during an external circular welding cycle of a seam extending along the pipe joint.

Figure 4:
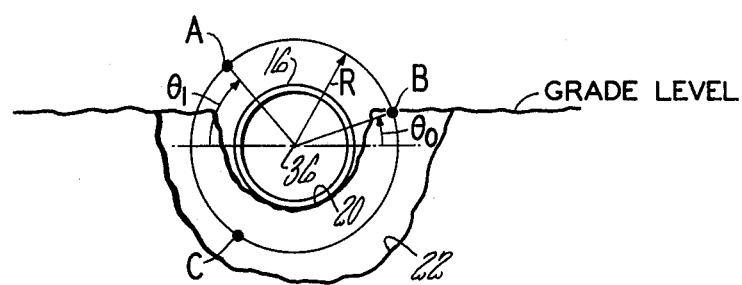
FIG. 4 is an end view schematically showing the location of certain reflectors at the upstream end of the apparatus relative to an axis of a pipe length to be welded.

Referring to the drawings in detail, an apparatus 10 embodying this invention is illustrated in FIGS. 1 and 2 as being operatively positioned for "on site" welding of a seam 12 joining pipeline or pipe 14 between abutting sections or lengths 16 and 18. Pipe 14 is shown in FIG. 2 as being located in a ground trench 20 in a generally horizontal position. Trench 20 defines the pipeline path and is shown extending beyond pipe length 16, which is the section to be added or welded to pipe length 18. Trench 20 has a depth illustrated as being sufficient to locate the center of pipe 14 below grade level. Opposite ends of pipe length 16 are received within enlarged troughs 22, 24 best seen in FIGS. 4 and 5, circumferentially extending about opposite ends of pipe length 16 such that it is exposed about the full circumference of the pipe length 16 at each of its ends.

A commercial carbon dioxide electric discharge laser 26 will be understood to be mounted within a housing 28 which is adapted for movement along trench 20. In operation, the housing 28 for laser 26 is received substantially in its entirety within trench 20 adjacent the free end of pipe length 16. Wheels such as at 30 are located at opposite ends of a pair of axles 32 of housing 28 for positioning housing 28 within trench 20 with axles 32 straddling trench 20 such that laser 26 is in position for discharging a collimated beam 34 of radiation along a fixed beam axis coincident with pipe axis 36.

A drive unit, not shown, of any suitable conventional construction is mounted in housing 28 for power operating a drive shaft 38 and its output gear 40 secured to an end of shaft 38. Output gear 40 is in meshing engagement with a driven gear 42 of a beam handling device 44. Gear 42 is concentrically fixed on an end of hollow support shaft 46 mounted on housing 28 for rotation about a longitudinal axis of shaft 46 generally coaxially aligned with pipe axis 36.

A planar central switching mirror 48 is supported on driven gear 42 within shaft 46 for rotary movement, about an axis coincident with pipe axis 36, in unison with rotation of driven gear 42. In addition, mirror 48 is shown mounted on gear 42 for rotation independently of shaft 46 and its gear 42 for receiving and redirecting laser beam 34 generally radially outwardly from pipe axis 36 through predetermined apertures 50 in shaft 46 to a selected one of various planar beam turning mirrors such as illustrated at A, B and C.

Upstream beam turning mirrors A, B and C are supported for orbital movement about pipe axis 36 on struts such as at 52 fixed to and extending outwardly from a rotary mounting plate 54 fixed to gear 42. Upstream beam turning mirrors B and C each serve to redirect beam 34 from central mirror 48 and along the upper outside surface of pipe length 16 to corresponding downstream beam focusing devices 56 and 58.

Downstream beam focusing devices 56, 58 each include a plurality of optically coupled individual reflectors mounted on struts such as at 60 fixed to a common driven ring 62 supported on pipe length 18 for rotation to effect orbital movement of the downstream reflectors about the pipe axis 36. Each device 56 and 58 has an input focusing reflector $B_1$ and $C_1$ which respectively correspond directly to upstream beam turning mirrors B and C, in that their circular orbit radius is R and their angular positions are identical. The input focusing reflectors $B_1$ and $C_1$ are respectively optically coupled to beam turning output reflectors $B_2$ and $C_2$.

For clarity of illustration, beam turning output reflectors $B_2$ and $C_2$ are shown as single mirrors but may comprise several mirrors because of the well-known 90° "bounce" angles involved in passing beams from their respective input focusing reflectors $B_1$ and $C_1$.

The mounting arrangement of downstream beam focusing devices 56, 58 do not constitute a part of this invention. It will suffice to recognize that (1) a driven ring 62 may be removably mounted for rotation on pipe length 18 adjacent joint 12, and (2) a drive motor 64 having an output gear 66 in meshing engagement with a toothed component of ring 62 serves to rotate ring 62 in timed relation to gear 42 of the upstream beam handling device 44 whereby optical components associated with gears 42 and 62 are rotated in unison. Synchronization of corresponding upstream and downstream reflectors may be effected by any suitable means which serve to adjust and match their angular positions by means of the driven rings 42 and 62 under normal operating speeds.

Input focusing reflector $B_1$ and its optically coupled output reflector $B_2$ provide a folded multiple reflection path to pipe joint 12 for transmission of a focused laser beam 34 onto a predetermined section of the pipe joint 12. A folded multiple reflection path is provided for each downstream focusing device 56 and 58 which path has a total length in each instance extending between input focusing reflectors $B_1$ and $C_1$ and the pipe joint 12 which is equal to the focal length of their respective input focusing reflector $B_1$ and $C_1$. Moreover, it will now be seen that central switching mirror 48 and each upstream beam turning mirror B and C and their corresponding downstream focusing devices 56 and 58 (comprising input focusing reflectors $B_1$ and $C_1$ and their respectively optically coupled beam turning output reflectors $B_2$ and $C_2$) are each rotatable in synchronism with one another to selectively direct a focused laser beam in sequence onto predetermined sections of pipe joint 12.

By virtue of the above described construction, trough 24 extending about pipe joint 12 is of a minimized depth, for the folded multiple reflection path provided by each beam focusing device 56, 58 enables the beam reflected from their input focusing reflectors $B_1$, $C_1$ to pass by pipe 14 with minimum clearance and yet be transmitted along a total path length equal to the focal length of the input focusing reflectors $B_1$ and $C_1$. However, the two reflectors $B_1$, $B_2$ and $C_1$, $C_2$ of each focusing device 56 and 58 are movable in a common circular orbit about pipe joint 12 at a radius R from the pipe axis 36 which results in the reflectors of the devices 56 and 58 being spaced from the joint 12 a distance which is significantly less than the focal length of each input focusing reflector $B_1$ and $C_1$.

The above described construction of apparatus 10 permits the unfocused laser beam 34 to be directed outside pipe length 16 in a circular sweeping movement above grade while yet ensuring facile quality welding of adjacent pipe sections 16, 18 along pipe joint 12 below grade.

More specifically, a complete external weld over a lower half section of the joint 12 is made by reflecting the unfocused laser beam 34 from the central rotary switching mirror 48 to direct the beam 34 from the pipe central axis 36 to each upstream beam turning mirror B and C to their corresponding downstream focusing devices 56 and 58 in sequence.

In the specifically illustrated embodiment, beam switching positions are illustrated in FIGS. 6–9 during a full 360° synchronized revolution of driven rings, 42, 62 and their associated optical components. A starting position is shown in FIG. 6 wherein upstream turning mirror B and its corresponding downstream input focusing reflector $B_1$ will be understood to be just above grade level at identical angular positions. Beam 34 is focused by reflector $B_1$ which also redirects the focused beam generally tangentially to the pipe 14, with a minimum clearance relative to the pipe 14, to a beam turning output reflector $B_2$ to pass radially onto point X which is at the lowest point on the pipe joint 12 and is the beginning of the welded seam.

Rotation of driven rings 42, 62 in unison in a counterclockwise direction causes unfocused beam 34 to pass from mirror 48 to reflector B and then to be directed along the outside of pipe length 16 in a circular sweeping motion above grade level about pipe axis 36. With drive motor 64 operating to rotate each beam focusing device 56, 58 in synchronism with the upstream beam turning mirrors B, C, a continuous weld is produced from point X in a counterclockwise direction to point Y as shown in FIG. 7 which is the first switching position.

At this first switching position Y, input focusing reflector $B_1$ and its corresponding upstream beam turning mirror B have rotated simultaneously to a position on an opposite side of pipe 14 (FIG. 7) symmetrical with their respective starting positions (FIG. 6). The section of joint 12 welded by apparatus 10 in this first phase of the operation is shown in FIG. 7 indicated by a heavy arcuate line extending between points X and Y.

Beam switching is now effected upon de-activating laser 26 and the drive to rings 42, 62 and then rotating the central beam switching mirror 48 to return it independently of the other components into its starting position wherein switching mirror 48 is optically coupled with beam turning mirror C through a suitable aperture 50A in shaft 46. Reactivation of laser 26 and the drive to driven rings 42, 62 causes beam transmission from beam turning mirror C onto downstream beam focusing device 58. This ensures that further simultaneous rotation of mirror C and device 58 in the counterclockwise direction results in input focusing reflector $C_1$ redirecting the beam in focused condition to output reflector $C_2$. From reflector $C_2$, the focused beam is directed radially onto the pipe joint 12 to weld the joint commencing at point Z and proceeding to point X on the pipe joint 12, which is the original starting position of the weld. FIG. 8 shows the completed weld between points Z and X. The weld is now complete over a length of seam 12 indicated by the heavy arcuate line in FIG. 8 extending between points Z, X and Y which includes the lower two quadrants of joint 12 and part of the upper half section of joint 12.

At this point, an upstream beam turning mirror A and a corresponding downstream beam focusing unit $A_1$, respectively disposed between mirros B, C and $B_1$, $C_1$ are both positioned in a plane containing pipe axis 36 and point Y on seam 12. With rings 42, 62 inoperative and with the laser 26 deactivated, the switching mirror 48 is rotated to effect a beam switch to redirect beam 34 onto beam turning mirror A through aperture 50B in shaft 46. Mirror A and mirror 74 of beam focusing unit $A_1$ rotate in timed relation since they are respectively connected by struts 70 and 72 to drive rings 42 and 62 which are synchronized to rotate the mirrors A, $A_1$ in unison. The beam turning mirror A will be understood to be angled slightly outwardly to direct the beam along the outside of pipe length 16 at an angle toward beam focusing unit $A_1$ which is rotatable in an orbit about pipe joint 12 at a radius $R_a$ from the central pipe axis 36.

By such construction, beam focusing unit $A_1$ commences welding at point Y which is identical to the terminal position of the first welded section between points X and Y. The laser beam focusing unit $A_1$ serves to direct the unfocused beam 34 in a focused condition directly onto pipe joint 12 and is accordingly positioned further away from pipe joint 12 than are input focus reflectors $B_1$ and $C_1$, it being understood that beam focusing unit $A_1$ is disposed at a distance from pipe joint 12 equal to the focal length of its mirror. Rotation of beam focusing unit $A_1$ in a counterclockwise direction results in a final weld commencing at point Y and proceeding to point Z over the topmost section of pipe joint 12 to complete the weld over the entire seam.

The above described construction of apparatus 10 results in a small radius R which is the orbital radius of beam turning mirrors A, B and C and the focusing devices 56, 58 to acheive compactness of structure. In practice, some clearance must be provided for beam passage, and therefore radius $R_0$ may be thought of as being the radius of the pipe 14 plus allowance for beam passage.

To minimize the depth of the trenches 22, 24 which must be dug below the pipe joint 12 to be welded and still permit rotation of the mirror 74 of the beam focusing unit $A_1$ at a radius $R_a$ over the top of seam 12, mirror 74 is provided with a telescopic strut 72 or, if desired, a pivot joint on strut 72 may be provided which supports this mirror 74 to permit its being folded in such a way as to require a trench depth (or distance from the bottom of pipe 14 to bottom of the trench 24) of only ($\frac{1}{2}$) ($R_a - R_0$) when mirror 74 is driven through an inactive portion of its orbit exclusive of the topmost range of its orbit between points Y and Z wherein the mirror 74 is operative to focus beam 34 and direct it onto joint 12. Since the upstream beam handling device 44 is located close to the position of the next joint to be welded, a similar trench 22 is dug there. This upstream trench 22 provides more than enough clearance for the beam handling device 44 which has a maximum radial dimensional requirement of R (FIG. 4).

Figure 5:
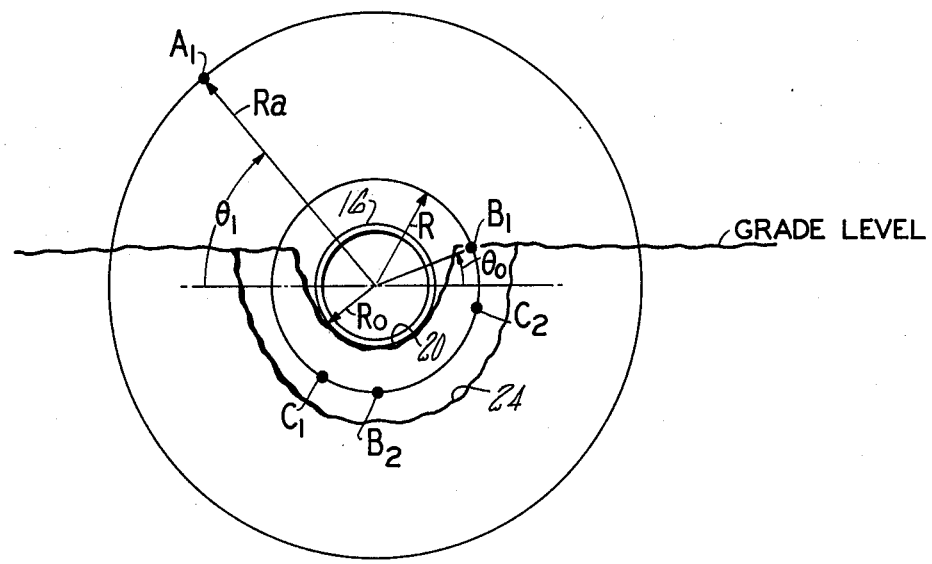
FIG. 5 is an end view similar to FIG. 4 schematically showing the location of certain reflectors at a downstream end of the apparatus relative to an axis of the pipe length to be welded.

FIGS. 6-9 show that, in its transmission from the upstream beam handling device 44 to the downstream focusing devices 56, 58, the unfocused beam 34 never goes below the starting positions, e.g., of reflector $B_1$. Therefore, grade level can be at or below this position. In FIGS. 4 and 5, angles $\theta_0$ and $\theta_1$ describe limiting positions of mirrors B, $B_1$ and A, $A_1$ respectively, in both upstream and downstream mirror orbits. Assuming the above mentioned "grazing" condition in beam passage relative to the pipe is permitted, and further assuming that angle $\theta_1$ is always equal to or greater than $\theta_0$, the geometrical parameters can be expressed in terms of pipe radius $R_0$ and angle $\theta_0$.

The radius of the upstream mirror orbit (and the mirror orbit of the downstream focusing units 56, 58) is:

$$\frac{R}{R_o} = \frac{2}{\sqrt{1 + \cos \theta_o} - \sqrt{1 - \cos \theta_o}};$$

the radius of mirror A in the downstream mirror orbit is:

$$\frac{Ra}{R_o} = 2 \left( \frac{1 + \sqrt{1 + \cos \theta_o} + \sqrt{1 - \cos \theta_o}}{\sqrt{1 + \cos \theta_o} - \sqrt{1 - \cos \theta_o}} \right);$$

the focal distance is:

$$\frac{F}{R_o} = \frac{2 + \sqrt{1 + \cos \theta_o} + \sqrt{1 - \cos \theta_o}}{\sqrt{1 + \cos \theta_o} - \sqrt{1 - \cos \theta_o}};$$

and the fraction of pipe 14 below grade is:

$$\frac{A}{\pi R_o^2} = 1 - \frac{1}{\pi} \left\{ \cos^{-1}\left(\frac{R}{R_o} \sin \theta_o\right) - \frac{R}{R_o} \sin \theta_o \sqrt{1 - \left(\frac{R}{R_o} \sin \theta_o\right)^2} \right\}$$

Figure 10:
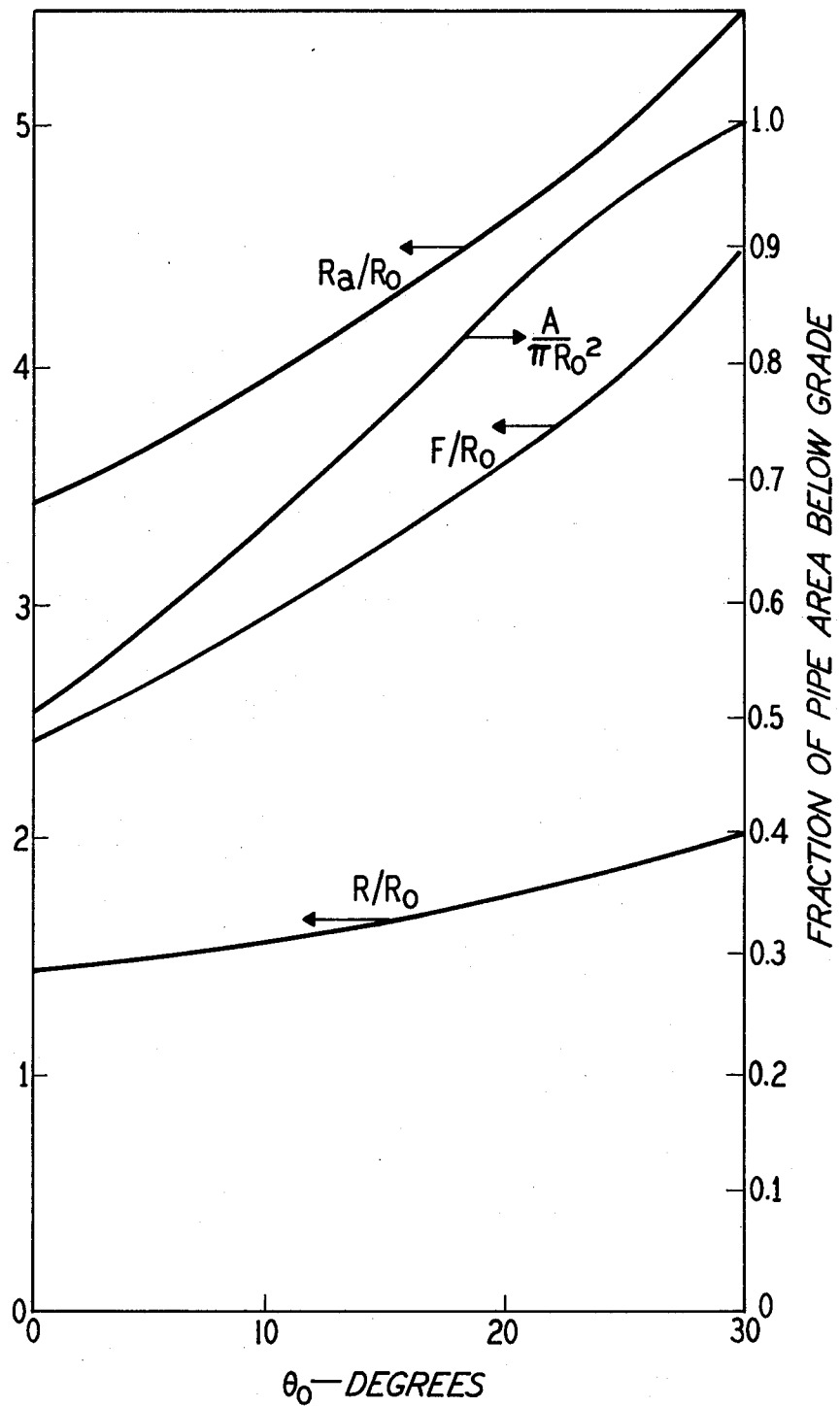
FIG. 10 is a graph showing the relationship among certain geometrical parameters of the apparatus of this invention.

These parameters are plotted in FIG. 10 over a range $0 \leq \theta_0 \leq 30°$ which is the permissible range of $\theta_0$, if $\theta_0 \leq \theta_1$.

FIG. 10 shows that the orbital radius of the mirror 74 of focusing unit $A_1$ may be from about 3.5 to 5.5. times the pipe radius; folding the strut 72 of mirror 74 would reduce this range to 2.25 to 3.25. The orbital radius R of the upstream beam turning mirrors A, B and C and downstream focusing devices 56, 58 varies from $\sqrt{2}$ to 2.0 times the pipe radius. The fraction of pipe cross sectional area below grade may be from 0.5 to 1.0. However, pipes well below grade can be welded if the "grazing" beam assumption is relaxed. The result is that the mirror orbital dimensions, $R_a$ and R, increase as the pipe 14 is buried deeper because the available angle over which the beam is accessible diminishes with pipe depth. Finally, the focal length ratio, $F/R_0$, can be used to specify a system since focal length and pipe radius would normally be known parameters. The example shown in FIGS. 4-9 was based on the solution for $F/R_0 = 3.6$, which requires $\theta_0 = 20°$, $R/R_0 = 1.743$ and $(A/\pi R_0^2) = 0.856$. Thus, the geometry in this case would apply, for example, for a pipe of 1 foot radius and a focal length of 3.6 feet.

To extend the coverage angle when the pipe 14 is further below grade than expected but without increasing the radius R of mirror orbit, longitudinal trenches can be dug along the pipe 14. In effect, this involves simply digging a trench somewhat wider than would normally be required to accommodate pipe 14.

The construction illustrated in the preferred embodiment is particularly suited to readily effect cooling of the mirrors. By virtue of the illustrated support struts which are used to mount the mirrors, water may be readily circulated through the struts to the mirrors to achieve the desired mirror cooling in a significantly simplified cooling system.

Another advantage of the described construction resides in the fact that only one of the focusing mirrors would require adjustment, namely, mirror 74. Adjustments to the folded multiple reflection paths of the downstream beam focusing devices 56, 58 can be effected without varying the focal length and without even adjusting the focusing mirrors $B_1$, $C_1$ simply by gimbaling the planar mirrors or beam turning output reflectors $B_2$ and $C_2$.

To minimize any danger of a misdirected laser beam and to protect the components from weather as well as to serve as a wind shield, a portable cover 80 is illustrated in FIG. 1 as being of a generally semi-circular cross section and having a length slightly greater than one pipe length. The cover 80 serves to minimize the undesirable effects of wind which could otherwise affect mirror oscillation and degrade welding performance. It will also be recognized that the construction of this invention not only provides for independent components separated by a full pipe length but essentially serves to provide alignment relative to the plane of the weld along pipe joint 12 itself rather than to the end of the pipe or pipe axis. Accordingly, the system is independent of any sag which may exist in the pipe section being welded. The trenches required are of a minimum depth by virtue of the folded multiple paths of the beam focusing devices at the downstream end of the pipe length being welded. In effect, proper placement of the mirrors on the described apparatus permits a full circular weld to be effected even though the pipe length such as at 14, e.g., which is to be added and welded at the joint 12 is being supported by the ground or other types of support over a large portion of its length, i.e., the pipe 14 is entirely or partially below grade.

As will be apparent to persons skilled in the art, various modifications, adaptations and variations of the foregoing specific disclosure can be made without departing from the teachings of this invention.

I claim:

1. An apparatus for welding on site a seam along a pipe joint between abutting lengths of pipe and comprising a plurality of laser beam focusing devices, each laser beam focusing device including an input focusing reflector and a beam turning output reflector optically coupled to one another and supported for orbital movement about the pipe axis at a distance from the pipe joint less than the focal length of the input focusing reflector, the plurality of beam focusing devices providing a like plurality of folded multiple reflection paths to the pipe joint for transmission of a focused laser beam into predetermined sections of the pipe joint.

2. The apparatus of claim 1 wherein the total length of the folded multiple reflection path for each focusing device, extending between its input focusing reflector and the pipe joint, is equal to the focal length of the input focusing reflector.

3. The apparatus of claim 1 wherein the input focusing reflector and beam turning output reflector are movable in synchronism with one another in a common orbital path about the pipe joint.

4. The apparatus of claim 1 further including a laser source for discharging an unfocused beam of radiation collimated about a fixed input axis coincident with the pipe axis, a central beam switching mirror mounted for rotation in concentric relation to the fixed beam input axis upstream of the pipe and the beam focusing devices for directing the beam generally radially outwardly with a circular sweeping movement, and a plurality of upstream beam turning mirrors supported for orbital movement about the central beam switching mirror and corresponding in number to the downstream beam focusing devices.

5. The apparatus of claim 4 wherein the central switching mirror is rotatable in synchronism with the upstream beam turning mirrors, the upstream beam turning mirrors each optically joining the central switching mirror and a selected one of the downstream beam focusing devices by redirecting the unfocused beam from its radially directed path to a path extending along the outside of the pipe in generally parallel relation to the pipe axis.

6. The apparatus of claim 5 wherein the central switching mirror is selectively rotatable relative to the upstream beam turning mirrors for directing the beam to a selected upstream beam turning mirror and its optically coupled downstream beam focusing device.

7. The apparatus of claim 6 wherein the upstream beam turning mirrors include two such mirrors corresponding to two downstream beam focusing devices for welding adjacent sections of the pipe joint comprising at least a lower half section of the pipe joint, the unfocused beam path along the outside of the pipe limited to a sector above the pipe axis, wherein a third upstream beam turning mirror is supported for orbital movement about the central switching mirror in synchronism with normal rotation thereof, and wherein a third beam turning output reflector is supported for orbital movement about the pipe joint, the third beam turning output reflector being disposed in corresponding angular relation to the third upstream beam turning mirror and rotatable in synchronism therewith for continuously transmitting a focused laser beam onto the pipe joint along an upper section thereof extending between said adjacent sections of the pipe joint.

8. The apparatus of claim 1 further including laser beam input means for continuously directing an unfocused laser beam to a selected one of the beam focusing devices in synchronism with its orbital movement about the pipe axis, the beam input means including beam switching means for switching the unfocused laser beam between the beam focusing devices upon completion of seam welding along their respective predetermined sections of the pipe joint.

9. The apparatus of claim 8 wherein the laser beam input means is mounted on a movable housing for selective positioning thereof relative to the pipe.

10. The apparatus of claim 1 wherein the beam focusing devices include first and second focusing devices each having an input focusing reflector, the input focusing reflectors of the first and second focusing devices being movable in a common orbital path about the pipe joint at a distance therefrom which is less than the focal lengths of the input focusing reflectors for transmitting a focused laser beam onto discrete first and second pipe joint sections respectively comprising at least the lower two quadrants of the pipe joint.

11. The apparatus of claim 10 further including a beam focusing unit supported for orbital movement about the pipe axis for transmitting a focused laser beam onto a pipe joint section extending between said first and second pipe joint sections.

12. The apparatus of claim 1 wherein said beam focusing devices include two substantially identical devices with the input focusing reflector and beam turning output reflector of each beam device being in predetermined angularly spaced relation to one another and to the reflectors of the other beam focusing device, the reflectors of the two beam focusing devices being movable in synchronism in a common orbital path about the pipe joint, the two beam focusing devices respectively transmitting a focused laser beam onto discrete sections of the pipe joint with said discrete sections of the pipe joint being in adjacent continuous relation to one another and having a projection profile, taken in a plane normal to the pipe axis, extending over at least a lower half of the pipe joint.

13. The apparatus of claim 12 wherein a laser beam focusing mirror is supported for orbital movement about the pipe joint for transmitting a focused laser beam onto the pipe joint along a remaining section thereof extending between said adjacent sections of the pipe joint.

14. The apparatus of claim 13 wherein the reflectors of the beam focusing devices revolve about the pipe joint at a distance therefrom which is less than the focal lengths of their input focusing reflectors, wherein the total length of the folded multiple reflection path for each focusing device, extending between its input focusing reflector and the pipe joint, is equal to the focal length of each input focusing reflector, and wherein said laser beam focusing mirror is extendible to and retractable from an operative position located at a distance from the pipe joint equal to the focal length of the laser beam focusing mirror for transmitting a focused laser beam onto the pipe joint along said remaining section thereof extending between said discrete adjacent sections of the pipe joint.

15. The apparatus of claim 14 wherein focusing units, comprising the input focusing reflector of each beam focusing device and the laser beam focusing mirror, are movable in synchronism with one another and are angularly spaced in relation to one another about the pipe axis, and wherein each focusing unit receives in timed sequence to one another an unfocused laser beam from a single source and redirects the beam as a continuous focused beam onto its respective pipe joint section responsive to movement of the focusing unit through an operative portion of its orbital path which is concentric to the upper two quadrants of the pipe joint.

16. Apparatus for welding a complete circular seam between abutting lengths of pipe, the longitudinally extending axis of which is below grade level, and comprising a laser source for discharging a collimated beam of radiation along a fixed beam axis coincident with the pipe axis, beam switching means including a mirror supported for rotation about the fixed beam input axis upstream of the pipe for directing the input beam radially outwardly of the pipe axis, a plurality of upstream beam turning mirrors supported for orbital movement about the pipe axis in timed relation to rotation of the beam switching mirror for intercepting the radially directed beam and redirecting the beam along the outside of the pipe, and a downstream plurality of mirrors corresponding to the upstream beam turning mirrors and supported for orbital movement about the pipe axis, the upstream beam turning mirrors each optically joining the central switching mirror and a selected one of the downstream mirrors for redirecting the unfocused beam onto abutting lengths of the pipe for welding a seam therebetween, the beam switching mirror being independently rotatable for selectively positioning the beam switching mirror to direct the input beam alternately onto each upstream beam turning mirror as it passes through part of its orbit located above grade level.

17. The apparatus of claim 16 wherein the downstream mirrors include a group of beam focusing mirrors corresponding in number and angular position to the upstream beam turning mirrors.

18. The apparatus of claim 16 wherein the downstream mirrors include first and second beam focusing mirrors and first and second beam turning mirrors, the downstream beam turning mirrors serving to redirect a focused beam from the downstream focusing mirrors to the joint between abutting pipe lengths, the first beam focusing mirror and first beam turning mirror jointly defining a first focused beam output path corresponding in length to the focal distance of the first focusing mirror, the second beam focusing mirror and second beam turning mirror jointly defining a second focused beam output path corresponding in length to the focal distance of the second focusing mirro, the radial distance between the pipe joint and the orbital path of movement of the first and second turning mirrors being less than the focal distance of the focusing mirrors.

19. The apparatus of claim 18 wherein the first and second focusing and turning mirrors are supported for movement in a common orbital path.

20. The apparatus of claim 18 wherein the downstream mirrors include a third beam focusing mirror movable in an orbital path about the pipe axis at a radial distance from the pipe joint corresponding to the focal length of the third beam focusing mirror for transmitting a focused beam directly onto the pipe joint.

* * * * *